Nov. 27, 1962  J. W. BRUNDAGE ET AL  3,065,499
TIRE CARCASS HOLDER AND CURING PRESS
Filed May 2, 1958  12 Sheets-Sheet 1

FIG. 1

INVENTORS
JAMES W. BRUNDAGE &
EDWIN E. MALLORY
BY

*Oberlin E. Limbach*
ATTORNEYS

FIG. 2

INVENTORS
JAMES W. BRUNDAGE &
EDWIN E. MALLORY
BY

*Oberlin & Limbach*
ATTORNEYS

FIG. 3

INVENTORS
JAMES W. BRUNDAGE &
BY EDWIN E. MALLORY

Oberlin & Limbach
ATTORNEYS

Nov. 27, 1962   J. W. BRUNDAGE ET AL   3,065,499
TIRE CARCASS HOLDER AND CURING PRESS
Filed May 2, 1958   12 Sheets-Sheet 4

FIG. 4

INVENTORS
JAMES W. BRUNDAGE &
BY EDWIN E. MALLORY

Oberlin E. Limbach
ATTORNEYS

Nov. 27, 1962   J. W. BRUNDAGE ET AL   3,065,499
TIRE CARCASS HOLDER AND CURING PRESS
Filed May 2, 1958   12 Sheets-Sheet 5

FIG. 4A

INVENTORS
JAMES W. BRUNDAGE
EDWIN E. MALLORY
BY
Oberlin & Limbach
ATTORNEYS

INVENTORS
JAMES W. BRUNDAGE &
EDWIN E. MALLORY
BY
Oberlin E. Limbach
ATTORNEYS

Nov. 27, 1962 J. W. BRUNDAGE ET AL 3,065,499
TIRE CARCASS HOLDER AND CURING PRESS
Filed May 2, 1958 12 Sheets-Sheet 7

INVENTORS
JAMES W. BRUNDAGE &
BY EDWIN E. MALLORY

Oberlin & Limbach
ATTORNEYS

Nov. 27, 1962  J. W. BRUNDAGE ET AL  3,065,499
TIRE CARCASS HOLDER AND CURING PRESS
Filed May 2, 1958  12 Sheets-Sheet 11

INVENTORS
JAMES W. BRUNDAGE &
EDWIN E. MALLORY
BY
Oberlin & Limbach
ATTORNEYS

Nov. 27, 1962    J. W. BRUNDAGE ET AL    3,065,499
TIRE CARCASS HOLDER AND CURING PRESS

Filed May 2, 1958    12 Sheets-Sheet 12

INVENTORS
JAMES W. BRUNDAGE &
EDWIN E. MALLORY
BY
Oberlin & Limbach
ATTORNEYS

United States Patent Office
3,065,499
Patented Nov. 27, 1962

3,065,499
TIRE CARCASS HOLDER AND CURING PRESS
James W. Brundage, Akron, and Edwin E. Mallory, Cuyahoga Falls, Ohio, assignors to National Rubber Machinery Company, Akron, Ohio, a corporation of Ohio
Filed May 2, 1958, Ser. No. 732,531
19 Claims. (Cl. 18—2)

The present invention relates generally as indicated to a tire handling and curing press, and more particularly to a press which embodies an automatic loader and unloader and to a press which embodies post-inflation means for inflating the cured tire and for cooling the same while inflated.

Hitherto, it has been the conventional practice to design tire curing presses to provide a top vertically movable mold section which, when moved upwardly away from the bottom mold section, enables placement of a green pulley band carcass in upright, centered position on the toe ring of the bottom mold section. Such loading of the press is heavy, fatiguing work, and especially so, in the case where an upstanding curing bag or diaphragm is employed and over which the carcass must be telescoped. Some of that heavy manual labor has been minimized by providing a diaphragm which, when the press is open, is in retracted or invaginated position in a well formed in the base of the press. See for example, the following patents: Brundage Pat. Nos. 2,730,763 and 2,778,060; Frank Pat. No. 2,743,480; and Heston Pat. No. 2,741,799. In the case of a press employed for curing and shaping a tubless tire carcass it has been found that, because the carcass is of fluid-tight construction, it may be cured and shaped without the use of a curing bag or diaphragm, and thus the problem of telescoping the carcass over the diaphragm is eliminated. However, other problems exist with the press in which no curing bag or diaphragm is used. For instance, the pulley-band carcass needs to be set on the bottom mold section for engagement by the top mold section and for reception of bead forming mechanism.

In any event, when the carcass has thus been set on the bottom mold section, the top mold section is moved downwardly to engage and to move the top bead of the carcass downwardly, and as the top mold section continues its descent, the carcass is progressively swelled radially approximately to final tire shape by the time that the mold sections come together into mating engagement. At that time, curing medium such as hot water or steam, is circulated through the interior of the carcass and of course, the mold sections being mounted on heating platens (or being of such nature that they are steam jacketed or heated by external steam contained in a steam vessel surrounding the mold) are likewise heated whereupon the carcass is expanded and cured in its final tire shape in the mold cavity defined between the mating mold sections.

With respect to the handling of the tire, after the curing operation has been completed and the press has been opened it has been the practice for a good many years to have the operator grasp the tire from between the mold sections and to place it onto a suitable conveyor. It has also been proposed more recently to insert an unloading platform (or arms) between the separated mold sections and to discharge the finished tire from the top mold section onto the platform, the platform preferably being in tilted position, at least when withdrawn from between the mold sections, so that the tire will slide off the platform onto a suitable conveyor, whereby the press operator need not handle the cured tire. After the cured tire has been unloaded from the press, the platform, if inclined when inserted, is withdrawn from the space between the mold sections and another pulley band carcass is loaded into the press for shaping and curing as aforesaid.

In the case of nylon or like tires, it has been found desirable to cool the cured tire while the cords thereof are under tension, but such cooling cannot be done as well in the curing press proper in view of the restraining effect of the surrounding mold cavity. Moreover, it is preferred not to tie up the curing press for cooling and inflating the tire after it has been partially stripped from the mold sections and while it yet is disposed between the separated mold sections. In addition it is undesirable to cool the press while performing the post inflation since additional time and expense must be taken to heat the press after the post inflation operation.

In the past, it has been the practice for an operator to service a number of presses and even though a press was automatically unloaded, there would be a delay if it was not immediately loaded by the operator. This problem has been especially difficult in an operation where the presses serviced by an operator were curing tires having different curing periods. In such an operation, the simultaneous opening of several presses could not be avoided and therefore some delay was unavoidable with the prior types of presses since the operator could not load more than one press at a time.

With the foregoing in mind, it is one principal object of this invention to provide a tire handling and curing press in which the press is automatically loaded and unloaded without requiring the operator to handle the carcass either before or after the cure.

It is another object of this invention to provide a tire handling and curing press having a laterally shiftable head which, when the press is open, clears the space above the bottom mold section so that a pulley band carcass may be loaded thereonto from an overhead carcass holder which lowers the carcass in upright position around the toe ring of the bottom mold section.

It is another object of this invention to provide a tire handling and curing press of the shiftable head type, as aforesaid, which is arranged to lift the cured tire out of the bottom mold section, to shift it laterally of the bottom mold section, and finally to discharge it from the top mold section onto a conveyor or tilted platform from which the tire slides away from the press.

It is another object of this invention to provide a tire handling and curing press in which the shiftable head thereof carries a post inflator which, in the case of nylon or like tires, is operative, during the curing of a tire in the cavity between the mating mold sections, to inflate and cool the previously cured tire, whereby the post inflating operation does not in any way reduce the productive capacity of the curing press and, in fact, the operating cycle of the press may even be shorter than normal because final cooling of the cured tire need not be done while it is in the mold cavity.

It is a further object to facilitate installing and removing molds from the tire press by making possible the use of an overhead conveyor when the upper press head is laterally displaced with respect to the lower press head.

A further object is to provide a tire carcass holder which reshapes the pulley band carcass into a cylindrical shape prior to loading.

It is a further object to provide a tire carcass loader which is adaptable for use with a wide range of different size tires.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

Figure 1:
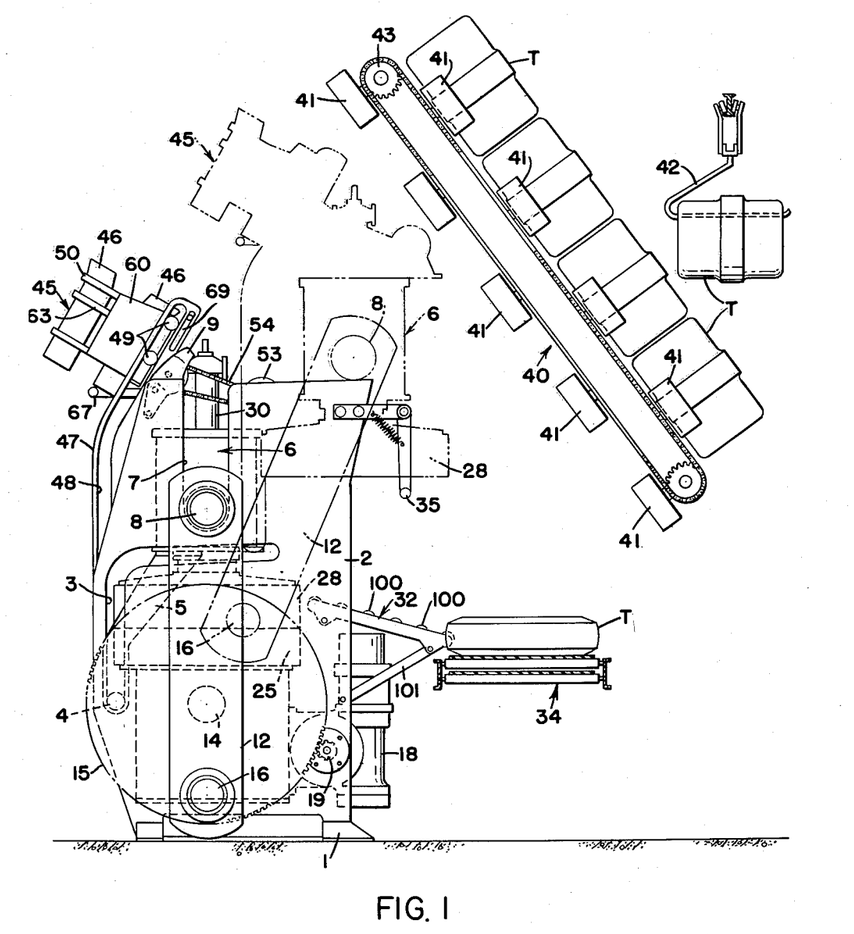
FIG. 1 is a side elevation view of a preferred embodiment of this invention, the curing press being shown in closed position in full lines and in open position in dot-dash lines.
Figure 2:
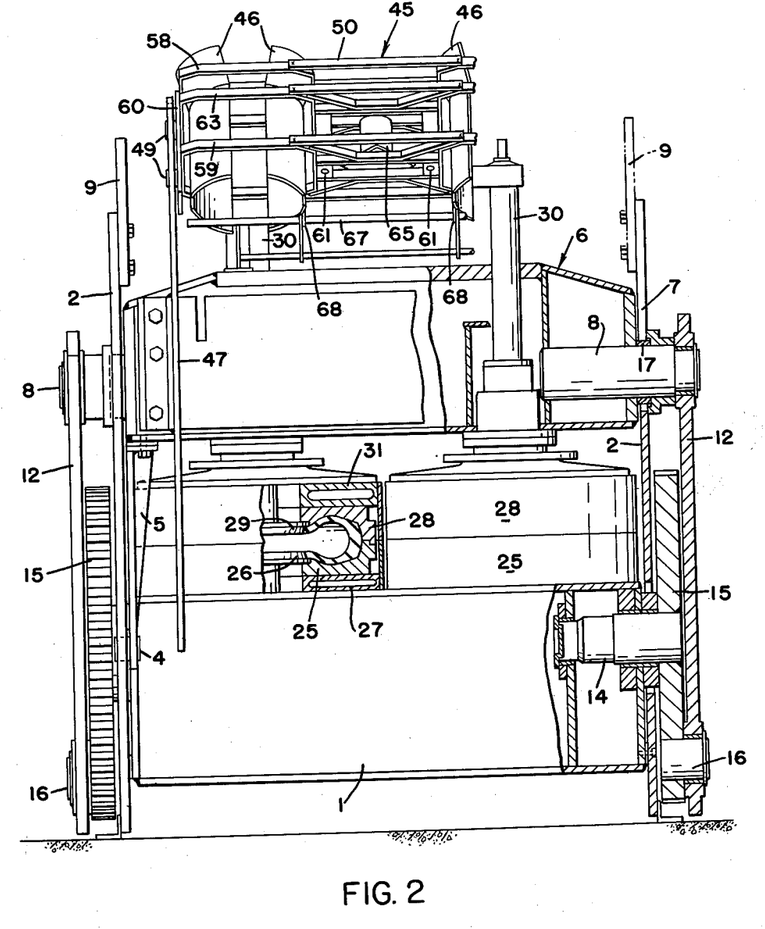
FIG. 2 is a front elevation view, partly in cross section, and on somewhat enlarged scale, as viewed from the left-hand side of FIG. 1.
Figure 3:
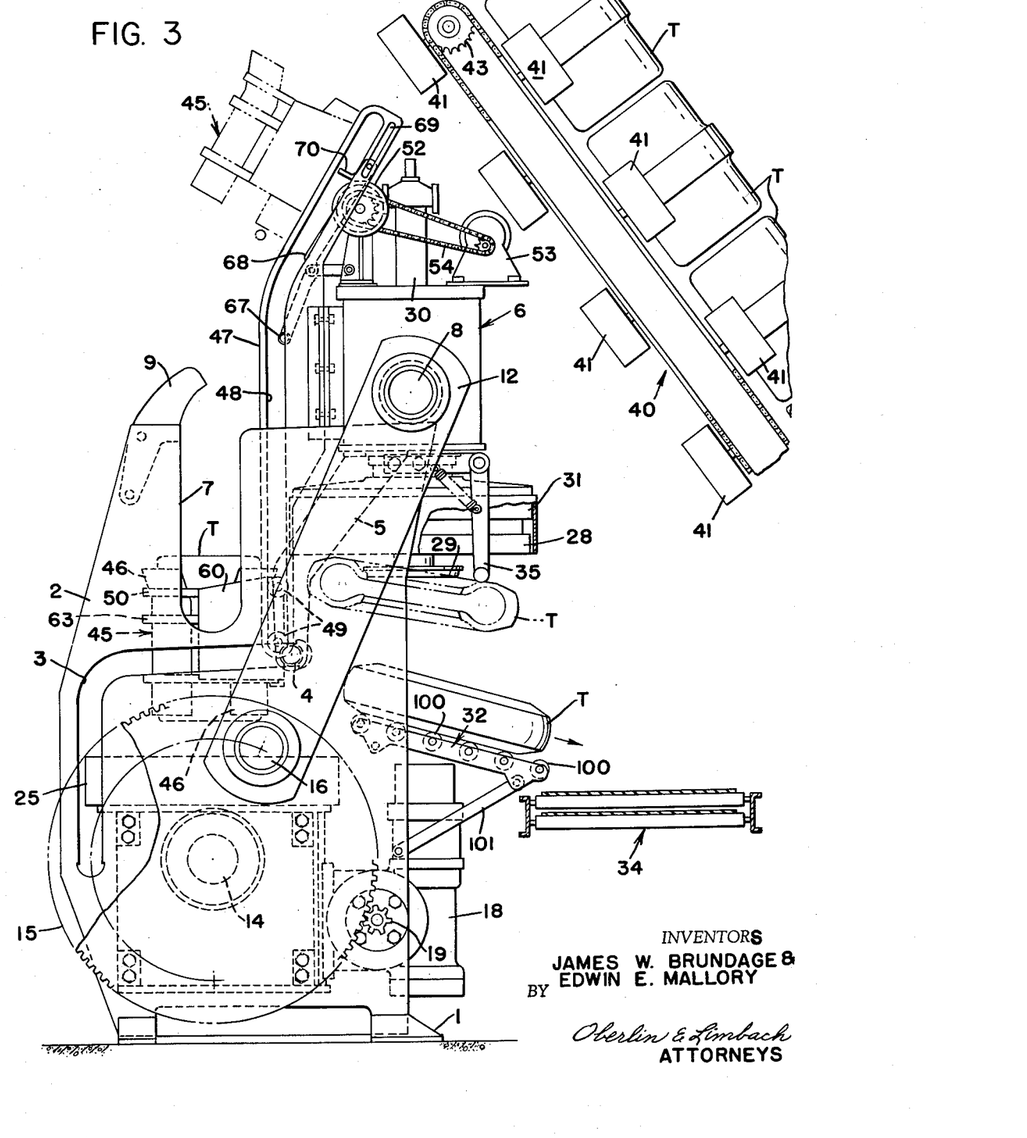
FIG. 3 is a side elevation view of the press as viewed from the right-hand side of FIG. 2 except showing the press in open position (the dot-dash line position of FIG. 1)
Figure 9:
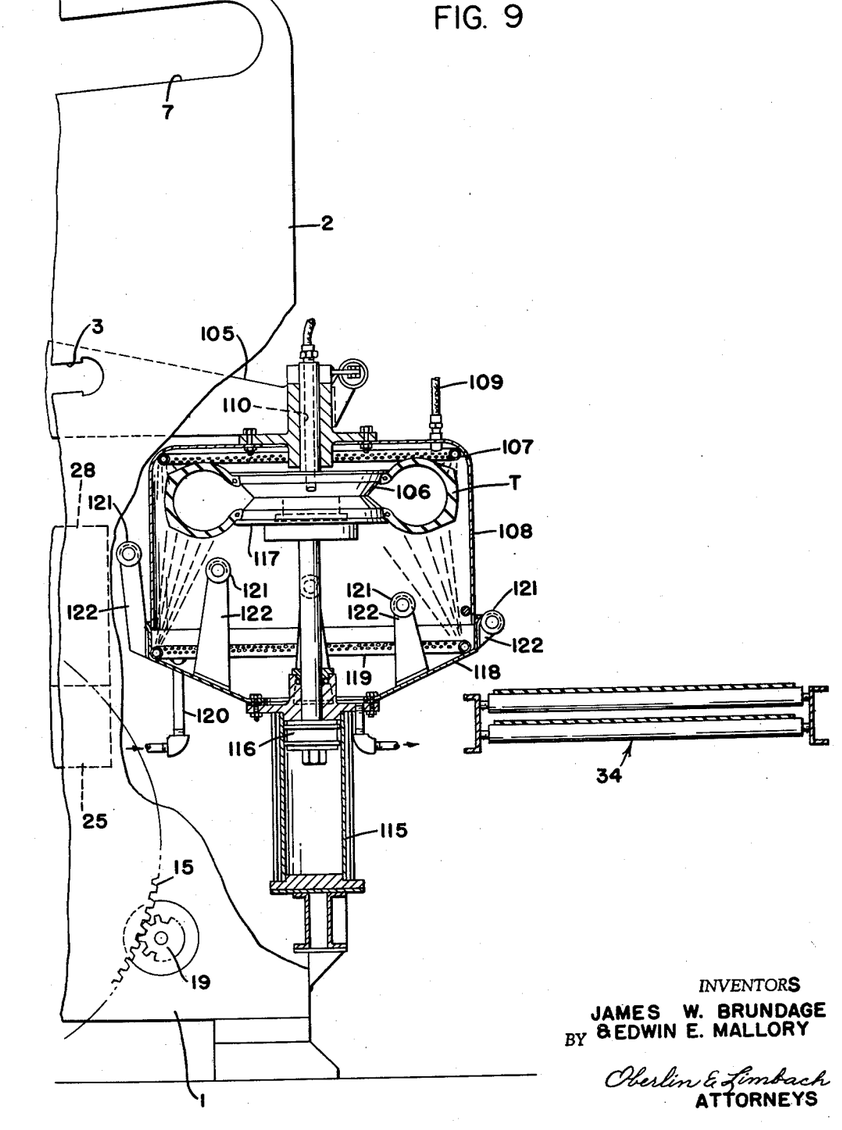
FIG. 9 is a fragmentary side elevation view of another modified form of press showing in vertical cross-section a post inflating device for inflating and cooling nylon or like tires.
Figure 10:
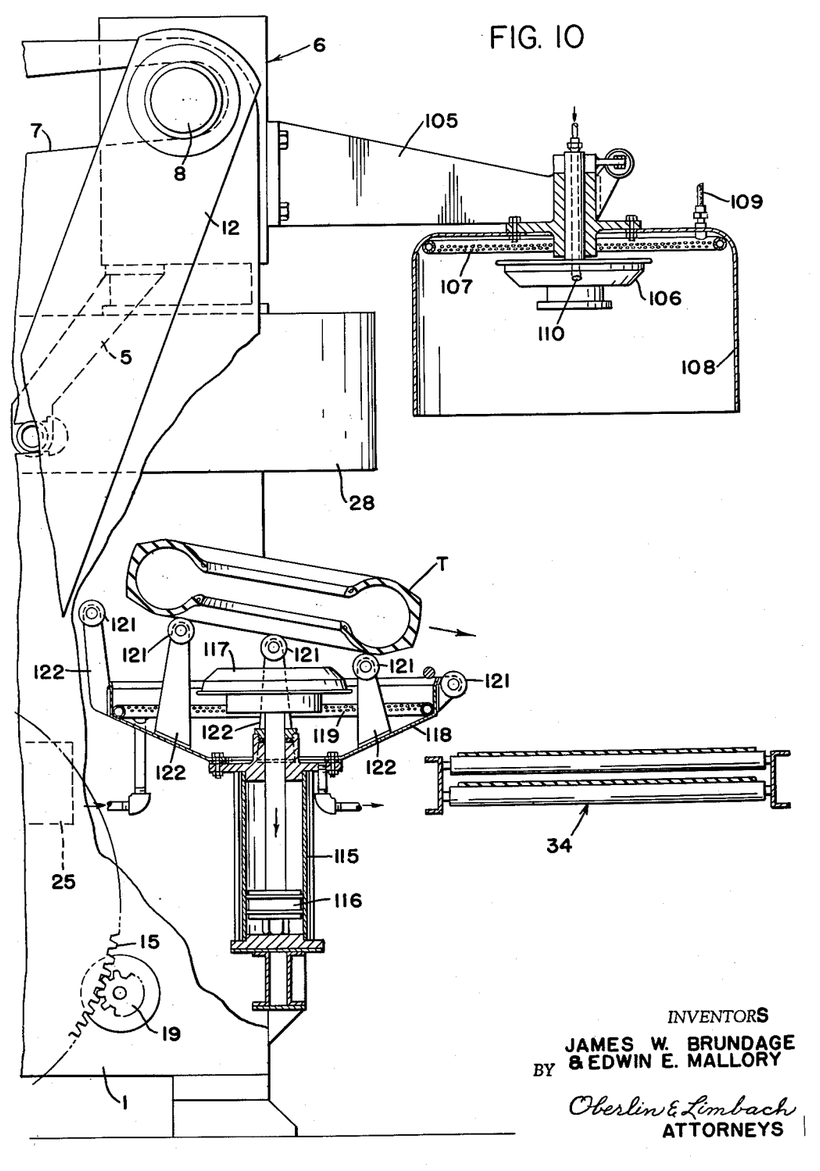
FIG. 10 is a cross-section view similar to FIG. 9 except showing the press in open position after the post-inflated and cooled tire has been lowered by the bottom inflator head onto the tilted unloader platform.
Figures 11, 12, 13:
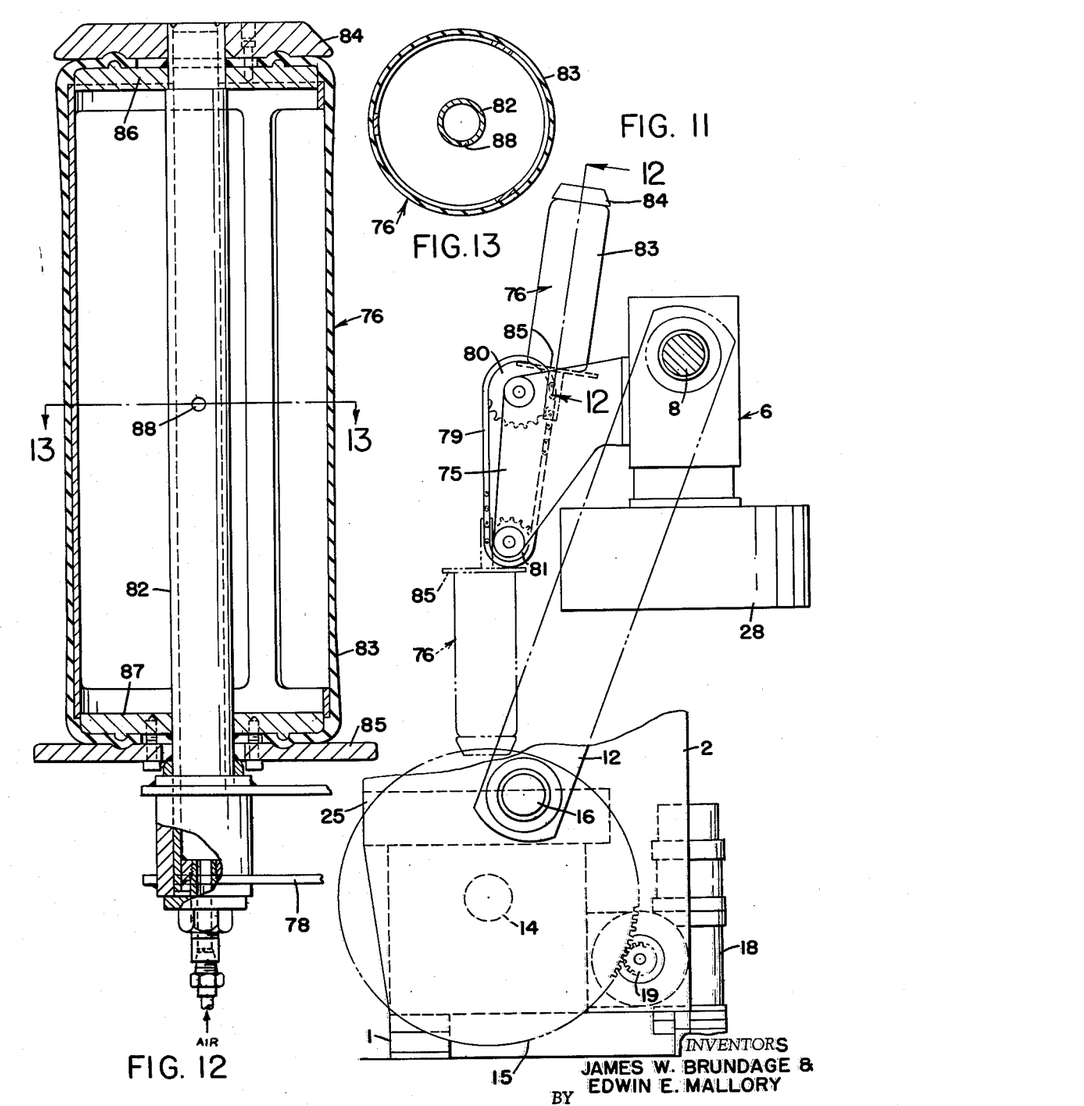
FIG. 11 is a side elevation view of a somewhat different form of press in which the overhead carcass loader includes a carcass holder in the form of an expansible bag that swings the carcass held thereby from the full line position and lowers the swung carcass to an upright centered position on the bottom mold section as shown in dot-dash lines.
FIGS. 12 and 13 are cross-section views on enlarged scale taken substantially along the lines 12—12, FIG. 11, and 13—13, FIG. 12, respectively.
Figures 14, 15:
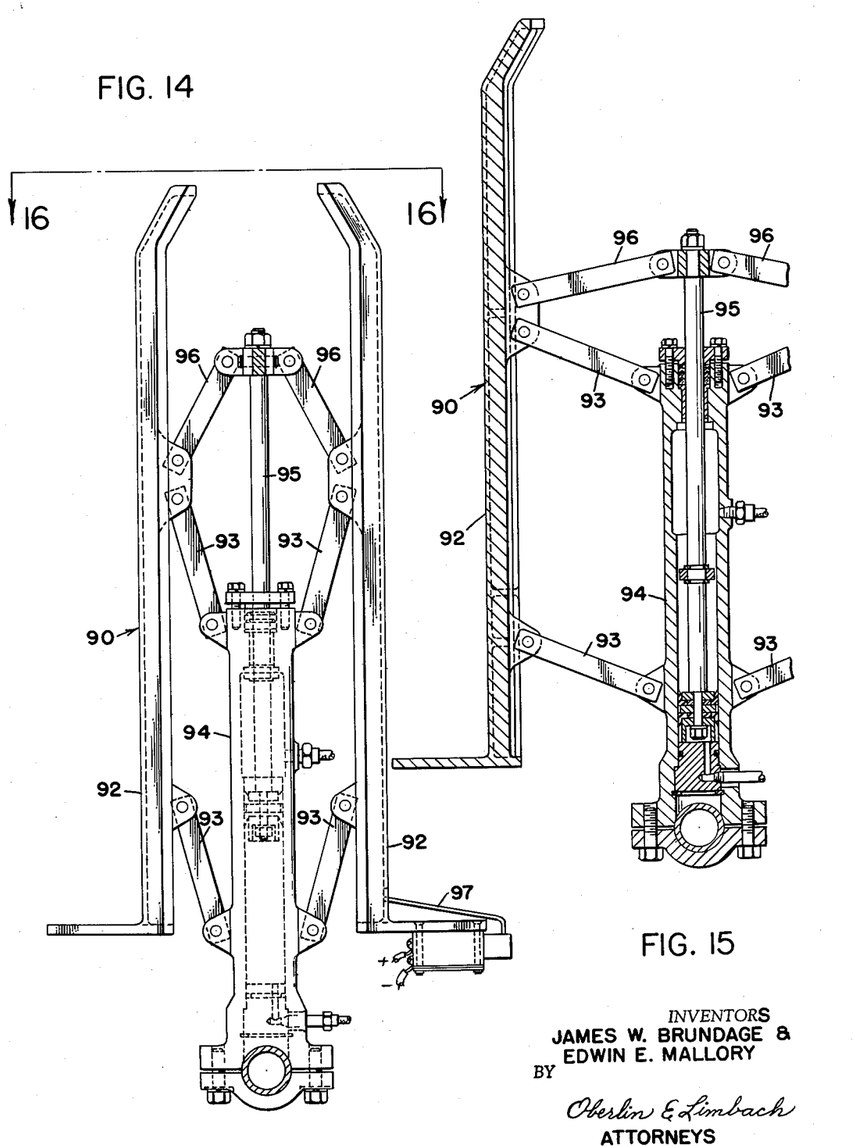
FIG. 14 is a side elevation view of an overhead carcass loader similar to that of FIGS. 11, 12, and 13 except that the expansible holder comprises segments which are moved in and out to release and to grip a pulley band carcass telescoped therearound.
FIG. 15 is a fragmentary cross-section view of the FIG. 14 holder except showing it in its expanded condition for internally gripping a pulley band carcass.
Figure 16:
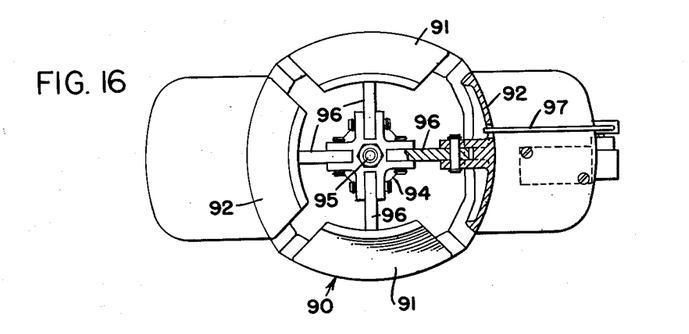
FIG. 16 is a plan view, partly in cross section, as viewed along the line 16—16, FIG. 14.

Referring now in detail to the drawings, the tire handling and curing press herein disclosed will be discussed in detail under the following headings:

(1) The Curing Press in General (FIGS. 1, 2, 3, 4, 17, and 18).
(2) The Carcass Supply Conveyor (FIGS. 1 and 3).
(3) Press Loading Mechanisms.
   A. Basket Types (FIGS. 1 to 7 and FIG. 8).
   B. Expanding Bag Type (FIGS. 11 to 13).
   C. Expanding Segment Type (FIGS. 14 to 16).
(4) Press Unloading Mechanism and Takeaway Conveyor (FIGS. 1 and 3).
(5) Post Inflation Device (FIGS. 9 and 10).
(6) Operation.

1. THE TIRE CURING PRESS IN GENERAL (FIGS. 1, 2, 3, 4, 17 AND 18)

The press herein disclosed comprises a base 1 to opposite ends of which are secured upstanding plates 2, each of which is formed with a first guide slot 3 for a guide roller 4 on a depending bracket 5 secured on the upper press head 6, such first slot 3 including a vertically extending portion and a generally horizontally extending portion as shown. Each plate 2 is also formed with a second guide slot 7 including a vertically extending portion and a generally horizontally extending portion (top of slot omitted) in which and on which the shaft 8 at the corresponding end of the press head is guided. In order to initiate the lateral shifting of the press head 6 as the shaft 8 reaches the upper open end of slot 7, there is provided a curved horn 9 on each plate 2 which is engaged by the shaft 8. The horn 9 is preferably detachable so as to reduce the height of the press for shipping purposes.

Figure 17:
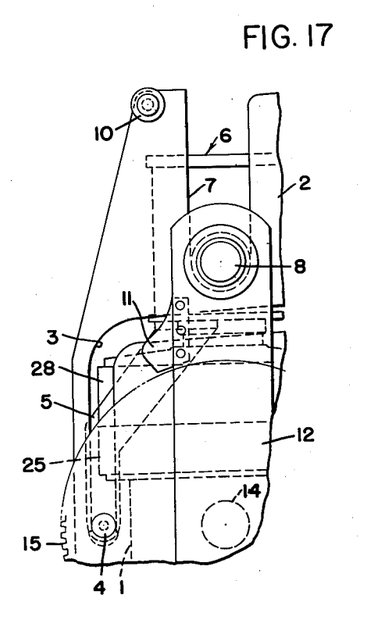
FIG. 17 is a fragmentary side elevation view showing a modified form of tire curing press.
Figure 18:
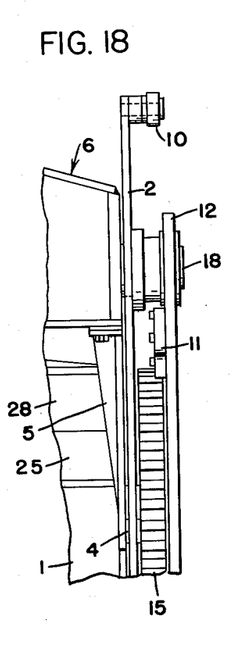
FIG. 18 is a fragmentary front elevation view, as viewed from the left-hand side of FIG. 17.

In lieu of the curved horn 9 aforesaid, each plate 2 may be provided with a roller 10 as shown in FIGS. 17 and 18, which is engaged by a cam block 11 affixed to the crank link 12 whereby the shaft 8 is shifted to the right, as viewed in FIG. 17, when said shaft 8 reaches the upper open end of the guide slot 7.

Journalled in each end of the base 1 is the stub shaft 14 of a bull gear crank 15 and pivotally secured to the crank pin 16 thereof is the lower end of the crank link 12, the upper end of link 12 being pivotally secured on the shaft 8 at the corresponding end of the press head 6. As evident, the press head 6 extends between the end plates 2 and preferably each shaft 8 thereof has a guide bushing 17 thereon which is a close sliding fit in the vertical portion of slot 7.

The bull gear cranks 15 are driven by electric motor driven gear reducers 18, the output shafts of which each has a pinion 19 in mesh with the teeth of the corresponding bull gear crank.

The press is shown in closed position in FIGS. 1 and 2, the crank pins 16 at that time being at the bottom with the links 12 disposed in vertical position. The rollers 4 which are carried by the brackets 5 depending from the press head 6 are disposed adjacent the bottoms of the vertical portions of the guide slots 3 and similarly, the shafts 8 of the press head 6 are disposed adjacent the bottoms of the vertically disposed portions of the guide slots 7.

The base 1 of the press carries a pair of bottom mold sections 25 in side by side relation each of which, as well-known in the art, is formed with an annular cavity which constitutes the molding surfaces for the bottom bead, the bottom side wall, and the lower half of the tread, or skid portion, of a tire. Each mold section 25 is provided with a toe ring 26 over which the bottom bead of a pulley band carcass T is adapted to be positioned, as hereinafter explained. Each mold section 25 has a heating platen 27 thereunder.

The press head 6 likewise, carries a pair of side-by-side downwardly facing top mold sections 28 which, like the bottom mold sections 25, each define an annular cavity defining the molding surfaces of the top bead, the top side wall, and the upper half of the tread or skid portion of the tire. However, the top toe ring 29 which engages within the top bead of the pulley band carcass T is mounted for downward movement with respect to the top mold section 28 for reasons which will hereinafter appear. The top toe ring 29 is moved down from seated position in the top mold section to downwardly protracted position and vice-versa, as by means of a double-acting fluid motor 30. Again a heating platen 31 is interposed between each top mold section 28 and the press head 6.

When the press is in closed position, as shown in FIGS. 1 and 2, the top and bottom mold sections 25 and 28 are in mating engagement thereby forming a tire-shaped cavity therebetween in which a tire T is adapted to be cured to final shape by circulation of curing medium such as hot water or steam, under pressure through the interior of the tire carcass.

When the bull gear cranks 15 are rotated in a clockwise direction as viewed in FIG. 1, for example, the links 12 will cause the upper press head 6 and top mold sections 28 to move vertically while held in horizontal position by the rollers 4 and shafts 8 that are guided in the vertically extending portions of the guide slots 3 and 7. As the bull gear cranks 15 continue to rotate, the rollers 4 will reach the curved portions of the slots 3 and the shafts 8 will engage the curved horns 9 whereby the press head 6 will be caused to move to the right to the dot-dash line position shown in FIG. 1, and to the full line position shown in FIG. 3. In FIGS. 17 and 18, the press head 6 is shifted toward the right when the cam blocks 11 on the links 12 engage the respective rollers 10.

It is to be noted that when the press is in open position, the space above the bottom mold section 25 is unobstructed so that a pulley band carcass T may easily be positioned from overhead and in upright position around the toe ring 26.

While not shown herein, it is to be understood that if the shaping of a pulley band tire carcass is to be done by means of a diaphragm, the same may be secured in the base of the press so as to project upwardly from the center of the bottom mold section, or such diaphragm may be arranged for retraction from operating position into a well in the base of the press in the manner clearly disclosed in the patents aforesaid. Furthermore, in the case of shaping and curing of tubeless tires, it has been found that the diaphragm may be dispensed with, but in that case it has been found desirable to provide bead shaping rings which serve to accurately shape the bead portions of the tire T. Bead shaping mechanisms of that character which may be employed herein are disclosed in the copending applications of James W. Brundage, Ser. Nos. 516,141, now Patent No. 2,959,815, and 517,139, now abandoned, filed June 17, 1955, and June 22, 1955, respectively.

Before describing the other components of the present invention the closing of the press and the shaping of a pulley band tire carcass T will now be touched upon. As aforesaid, when the press is in open position, as shown in dot-dash lines in FIG. 1, and as shown in FIG. 3, the space above the bottom mold section 25 is clear for the placement, in upright position, of a pulley band tire carcass T around the toe ring 26 of the bottom mold section. With a pulley band tire carcass thus placed in upright position on the bottom mold section 25, the press may be closed by rotating the bull gear cranks 15 counterclockwise as viewed in FIG. 3 to cause the upper press head 6 to shift toward the left to position the top mold section 28 coaxial with the bottom mold section 25 and the upright pulley band tire carcass loaded on the latter. When the shafts 8 and rollers 4 reach the vertical portions of the guide slots 3 and 7, the top mold section 28 will be guided so that as it moves down, it will be coaxial with the bottom mold section 25. During the downward movement, the toe ring 29 of the top mold section will engage and move the top bead of the carcass downwardly and, if desired, air under pressure may be admitted into the carcass (or into the diaphragm, if one is provided), to assist in progressive swelling of the carcass to tire shape. Finally, when the mold sections 25 and 28 are in mating engagement, curing fluid under higher pressure may be admitted into the carcass T to final shape to conform with the tire-shaped cavity defined between the mold sections, or, in case a diaphragm is employed, such curing fluid will be admitted into the diaphragm whereby it will so press the carcass into engagement with the walls of the mold cavity.

After the curing operation has been completed, the press is opened and preferably the bottom mold section 25 will have been treated with anti-stick material so that the cured tire will be stripped therefrom and will be lifted by the top mold section 28 and shifted rearward of the press. The fluid motor 30 may then be actuated to move the top toe ring 29 downwardly thereby stripping the cured tire from the top mold section 28. The tire T will then drop from toe ring 29 onto the downwardly inclined platform 32 from which it slides off onto the takeaway conveyor 34. Should the tire T stick on the toe ring 29 a spring loaded stripper bar 35, which moves between the mold section 28 and the tire T, will force the tire off the toe ring as the toe ring is moved upwardly into position and the tire T is pressed upwardly against the stripper bar 35.

2. THE CARCASS SUPPLY CONVEYOR
(FIGS. 1 AND 3)

The carcass supply conveyor is shown in FIGS. 1 and 3 as comprising an endless chain conveyor 40 on which are mounted a plurality of carcass support saddles 41 on which pulley band tire carcasses T are placed from a hook conveyor 42 either manually, or automatically, as desired. When the successive saddles 41 pass around the upper sprocket wheel 43 of the conveyor, the pulley band carcasses carried thereby will fall off into the press loading mechanism 45 now to be described in detail under the heading (3) Press Loading Mechanisms.

3. PRESS LOADING MECHANISMS

A. *Basket Types (FIGS. 1 to 7 and FIG. 8)*

The press loading mechanism 45 shown in FIGS. 1 to 7 is of the basket or split sleeve type in which a plurality of arcuate sleeve segments 46 are adapted to be moved radially inwardly to grasp a pulley band tire carcass T therebetween.

Figure 4:
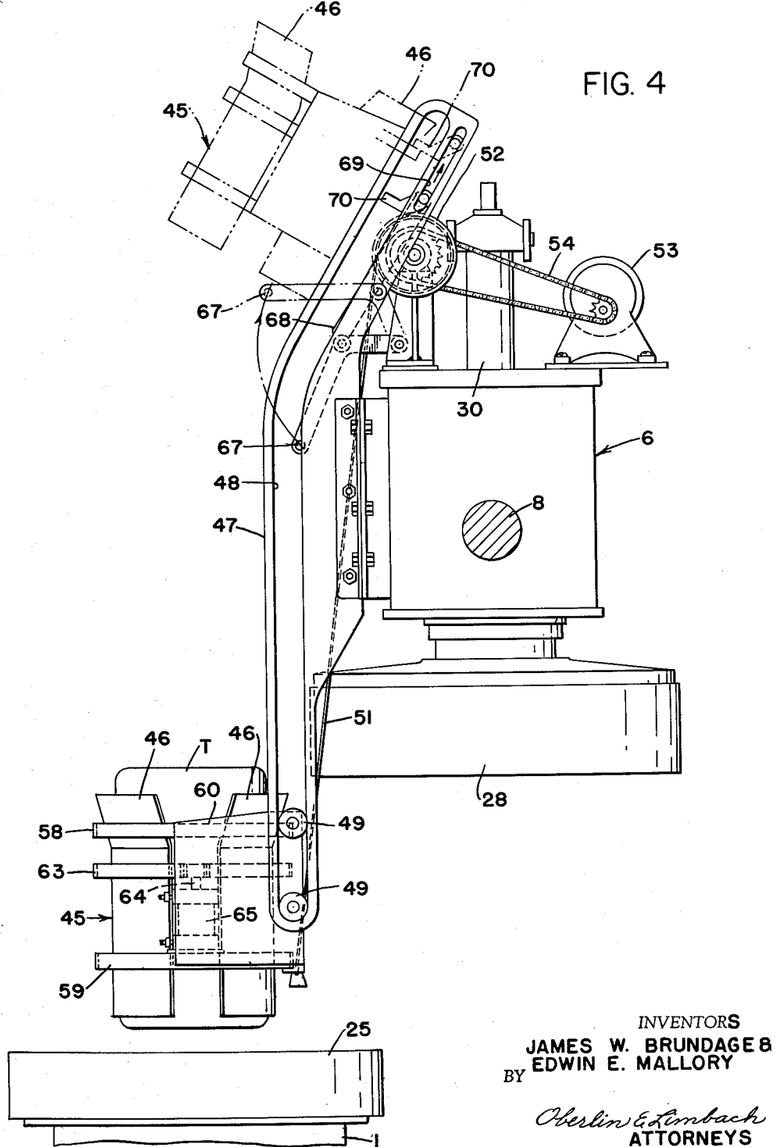
FIG. 4 is a side elevation view showing the upper portion of the press in its open position and showing a preferred form of overhead carcass loader which holds a pulley band carcass and lowers the same to coaxial, upright position on the bottom mold section of the press.

The loading mechanism 45 is movably mounted on a pair of brackets 47 that are secured to the press head 6 adjacent its ends, for movement from tire carcass receiving position (the dot-dash line position in FIGS. 1, 3 and 4) to loading position, as shown in full lines in FIGS. 3 and 4.

Figure 5:
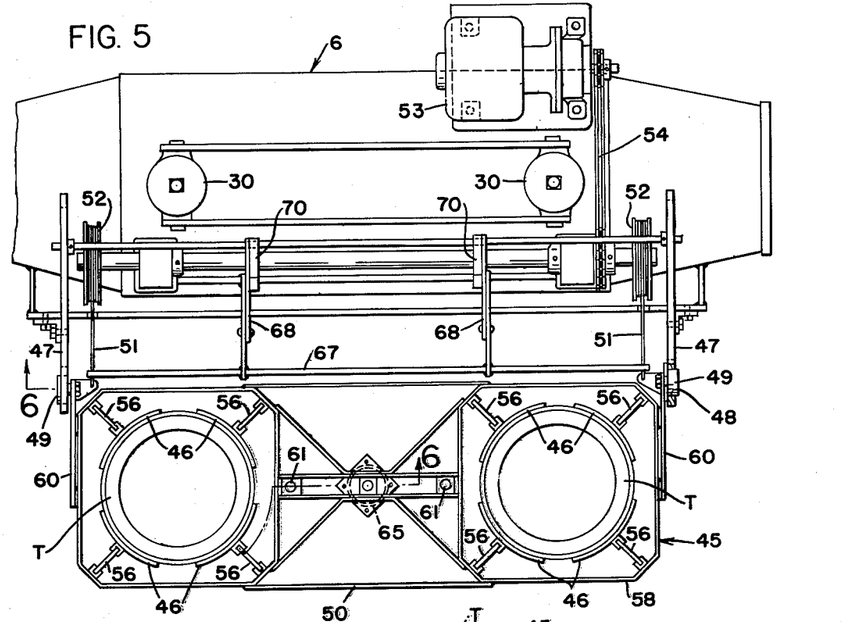
FIG. 5 is a plan view of the carcass loader as viewed from the top of FIG. 4.

Each bracket 47 is formed with a guide slot 48, in which is engaged the spaced rollers 49 of the corresponding end of the frame 50 of said loading mechanism. The frame 50 raised and lowered between the aforesaid positions as by means of cables 51 secured to the ends of the frame and wound about the respective drums 52 which are driven by an electric motor 53 and chain drive 54, as best shown in FIGS. 4 and 5.

Figure 6:
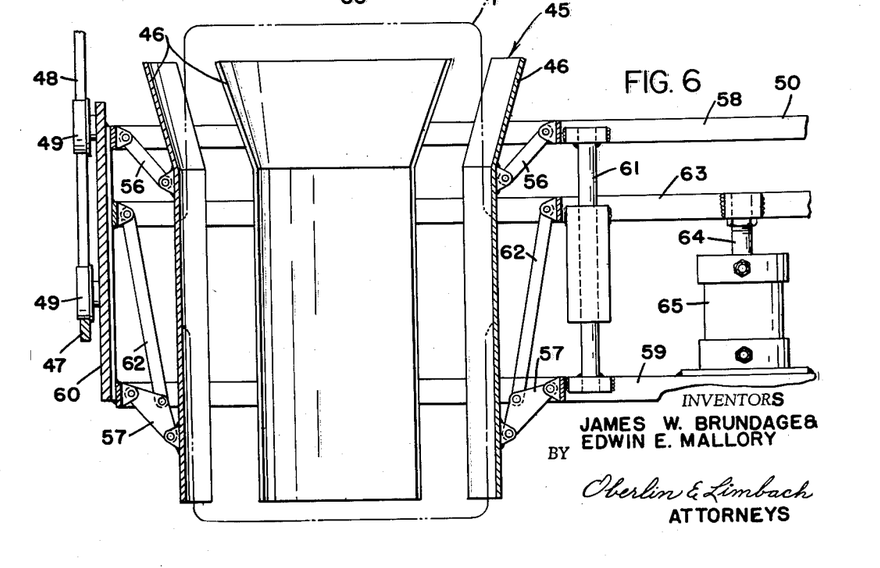
FIG. 6 is a cross-section view, on enlarged scale, taken substantially along the line 6—6, FIG. 5.
Figure 7:
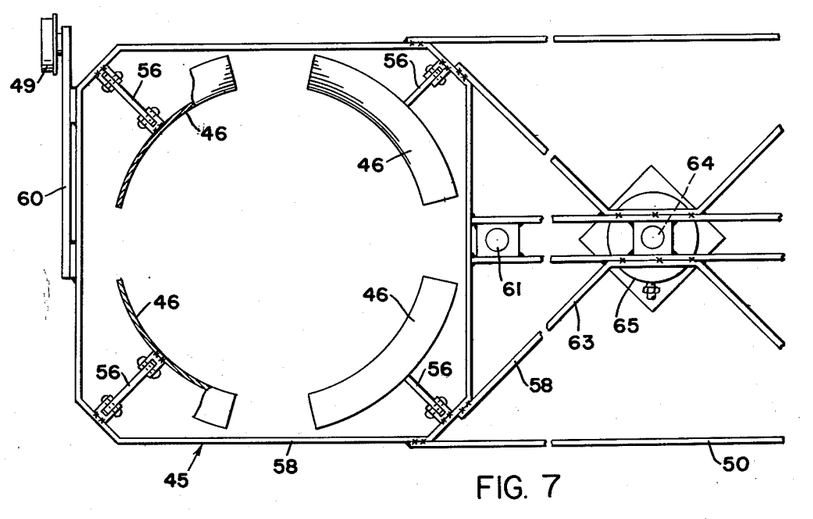
FIG. 7 is a fragmentary plan view, partly in section, as viewed from the top of FIG. 6.

Referring especially to FIGS. 6 and 7, the segments 46 of each carcass holder are connected by means of parallel links 56 and 57 to the fixed frame members 58 and 59, respectively, which are secured at their ends to the roller brackets 60 and which are secured to each other between their ends by bars 61. Parallel swinging movement of the segments 46 inwardly to grip a tire carcass therebetween and outwardly to release the carcass is effected by links 62 which are pivotally connected to links 57 and to a movable frame member 63, the movable frame member being guided on bars 61 and being moved up and down by the piston 64 of a cylinder 65 mounted on frame member 59.

When the press is open and when the carcass holder segments 46 are moved outwardly, a pulley band tire carcass T will slide off the top saddle 41 of each conveyor 40 into the space between said segments. The carcass is prevented from dropping through the holder by the bar 67 which is carried by levers 68 pivotally connected to the press head and actuated to carcass stopping position by means of links 68 movable in slots 69 of the respective brackets 47. Said links 68 have lugs 70 that are engaged by the upper frame member 58 as the loader approaches its upper position. Thus, the stop bar 67 is swung to the dot-dash line position of FIG. 4 to serve as a stop for the carcass and as apparent when the holder is lowered the stop bar 67 will swing down out of the way by gravity.

Figure 4A:
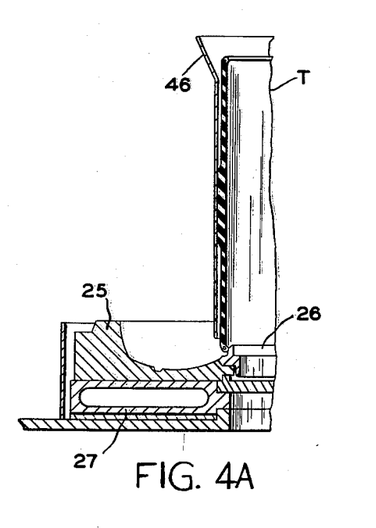
FIG. 4A is a fragmentary radial cross-section view showing a carcass loader that positions the bottom bead of the carcass around the toe ring of the bottom mold section.

When the carcass T is disposed in the holder, the cylinder 65 will be actuated to cause the segments 46 to move inwardly to grasp the carcass T therebetween. Thereafter, the motor 53 will be energized to turn the drums 52 in a direction such that the frame 50 will descend along the guide slots 48 of the brackets 47. The carcass T will, therefore, be disposed in upright position above and coaxial with the bottom mold section 25 and then, at the proper time, preferably when the bottom bead of the carcass T is just above, or has just engaged around the toe ring 26 of the bottom mold section 25 as best shown in FIG. 4A, the cylinder 65 may be actuated to move the gripping segments 46 of the holder out of engagement with the carcass. The drive motor 53 then may be operated in the opposite direction to rotate the drums 52 in a direction to wind the cables 51 thereon, thereby raising the frame 50 and the loader to its carcass-receiving position at the top of the press whereat the stop bar 67 is actuated, as aforesaid, to locate the next carcass in the holder.

In order to achieve placement of the carcass T around the bottom toe ring 26 as shown in FIG. 4A all that it is necessary to do is to extend the brackets 47 and guide slots 48 downwardly, or to provide a stop bar 67 that allows the bottom bead of the carcass T to project farther below the segments 46, or to mount the carcass holder lower with respect to the guide rolls 49.

Figure 8:
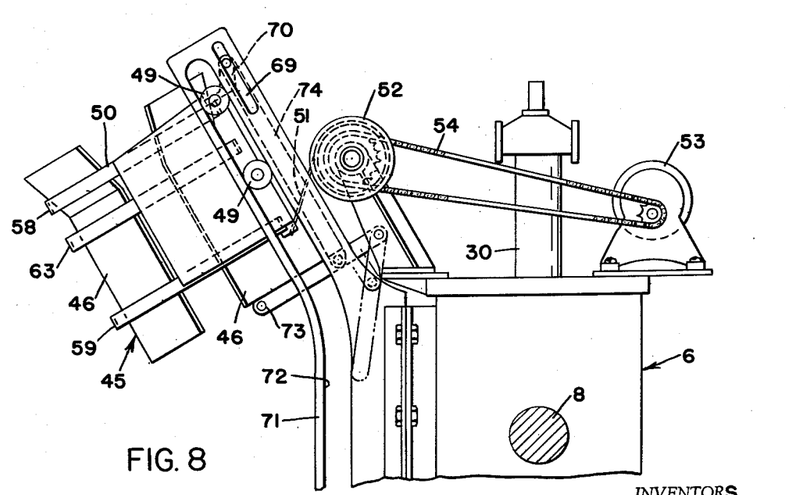
FIG. 8 is a side elevation view of the upper portion of a modified form of press.

The loader 45 shown in FIG. 8 is the same as that shown in FIGS. 1 to 7 except that the upper portion of the guide bracket 71 and the guide slot 72 in which rollers 49 are engaged is inclined upwardly and forwardly of the press to receive tire carcasses T from that side. A stop bar 73 is actuated by link 74, and as before, the lug 70 is engaged by frame member 58 to automatically bring the stop bar 73 to the position shown in full lines when the loader 45 is hoisted by cable 51. After the carcass T has been gripped between segments 46 and as the loader is lowered, the stop bar 73 moves by gravity to the dot-dash line position.

B. *Expanding Bag Type (FIGS. 11 to 13)*

In the form of the present loading mechanism shown in FIGS. 11 to 13, the upper press head 6 is provided with brackets 75 adjacent its ends upon which an expansible bag assembly 76 is movably carried by a cross bar 78 which is secured to the links of endless chains 79 that are trained over sprocket wheels 80 and 81, the sprocket wheels being journalled in the respective brackets 75 and one being driven as by an electric motor (not shown). Thus, when the sprocket wheels 80 and 81 turn counter-clockwise as viewed in FIG. 11 the assembly 76 is swung around as the chain 79 passes over sprocket wheel 80 and is moved down as the stretch of chain moves down from sprocket wheel 80 to sprocket wheel 81.

The bag assembly 76 comprises center support tube 82 through which air under pressure is admitted inside the elastic diaphragm 83 which has its ends clamped between the respective heads 84 and 85 and plates 86 and 87 at the top and bottom. The bottom head 85 is of larger diameter than the normal diameter of the diaphragm 83 so as to be engaged by the lower end of the pulley band tire carcass which is adapted to be telescoped over the diaphragm assembly as from the supply conveyor 40 previously described. When a pulley band tire carcass has been thus positioned over or around the diaphragm 83, fluid under pressure is admitted into the tubular support 82 and flows out through the openings 88 into the space inside the diaphragm causing the latter to expand radially to interiorly grip the pulley band tire carcass.

The mechanism is then actuated to swing the bag assembly 76 around the front of the press to invert the carcass and to move the same down coaxially with respect to the bottom mold section 25 until the bottom bead of the carcass is near, or on, the toe ring 26 of the bottom mold section. At that time, the fluid pressure inside the diaphragm 83 is released whereupon the diaphragm contracts out of gripping engagement with the pulley band carcass, the bag assembly 76 then being retracted vertically out of telescoping relation within the pulley band tire carcass and then is swung back to the full line position shown in FIG. 11.

With a pulley band tire carcass thus loaded in upright position and coaxial with the bottom mold section 25, the press may be actuated as before to shift the press head 6 forwardly to a position such that the top mold section 28 is coaxial with the bottom mold section and with the pulley band tire carcass. Then follows the succession of operations previously described under the heading (1) Tire Curing Press in General.

C. *Expanding Segment Type (FIGS. 14 to 16)*

The expanding segment type of carcass holder 90 is adapted to be mounted for movements as just described in connection with the expanding bag type of holder 76. However, in this case instead of employing an elastic expansible bag 83 for internally gripping the pulley band tire carcass, the segments 91 and 92 are connected by parallel links 93 to a central support column 94 which is in the form of a pneumatic cylinder in which a piston 95 is reciprocable, the piston being connected by links 96 to the segments 91 and 92 as shown, whereby when the piston 95 is moved downwardly from the position shown in FIG. 14 to the position shown in FIG. 15, the links 96 are effective to move the segments 91 and 92 radially outwardly through the parallel links 93. In this way the segments 91 and 92 grip on the inside of the pulley band tire carcass so that the holder 90 may be swung and vertically reciprocated in the same manner as described in connection with the expanding bag holder 76. The tire supporting ledge of one of the segments 92 may have a switch operating finger 97 thereon to actuate cylinder 94 whenever a carcass is loaded on said holder 90.

4. PRESS UNLOADING MECHANISM AND TAKE-AWAY CONVEYOR (FIGS. 1 AND 3)

To the rear of the press is an unloading conveyor 32 which comprises a downwardly and rearwardly tilted platform carrying anti-friction rollers 100, said platform being pinned to the opposite end plates 2 and the rear end thereof being supported by bars 101 that are pinned to the platform 32 and to the end plates 2, respectively, as clearly shown in FIGS. 1 and 3.

The tilted platform 32 is located beneath the top mold section 28 when the press is open so that when the top toe ring 29 is moved downwardly by actuation of the motor 30, the cured tire T will be stripped from the top mold section 28 and will drop down onto the tilted platform 32 and will slide down the rollers 100 thereof onto a takeaway conveyor 34 which may be of the endless belt type as shown. Should the tire T stick on the toe ring 29, the spring loaded swinging bar 35 will move in between mold section 28 and the tire T to force the top bead thereof downwardly away from the toe ring 29. Said bar 35 is arranged to be automatically swung out of the way to the dotted line position as the upper press head shifts forwardly, the ends of the bar being engaged with the rear edges of the end plates 2 during such shifting movement.

5. POST INFLATION DEVICE
(FIGS. 9 AND 10)

In the case of a nylon or like tire, it has been found desirable to cool the cured tire while the nylon cords thereof are under tension and for doing that, the upper press head 6 has a rearwardly extending bracket 105 mounted thereon which carries a top bead engaging disk 106, a circular spray ring 107, and a downwardly opening hood 108. The spray ring 107 is connected to a cold water line by hose 109. An air passage 110 extends through the stem of disc 106 by which air pressure is supplied into the tire T. The disk 106, ring 107, and hood 108 may be mounted on the press head 6 for movement therewith as shown or may be mounted on the press head 6 or some other supporting structure for movement independent of the movement of the press head.

The base of the press has mounted thereon an upwardly extending cylinder 115, the piston 116 of which carries a disc 117 for engaging the bottom bead of the tire T. The upper end of the cylinder 115 carries an upwardly open hood 118 that is complemental with the top hood 108 so as to form a substantially closed chamber when the hoods are brought together, as shown in FIG. 9. The bottom hood 118 also carries a circular spray ring 119 to which cold water is supplied through pipe 120.

The operation of the post inflator is as follows: When the press is open, the piston 116 is moved upwardly so that the tire T that is discharged from the top mold section 28 is caught on the bottom disc 117 which now projects upwardly above the inclined series of rollers 121 that are carried by the brackets 122 of the bottom hood 118. Now, as the press is closed, the upper hood 108 will move to a position coaxial with the bottom hood 118 whereupon, when the upper press head 6 descends vertically to shape and cure the next tire, the hood 108 will move down to engage the top disc 106 with the bottom disc 117, said discs providing seats for the tire beads. In this position of the assembly shown in FIG. 9, the carcass T may be inflated as with air under pressure supplied through the passage 110 thereby imposing a tensile stress in the nylon cords of the tire. While the nylon cords are thus being stretched or put under tension, cooling water is sprayed by spray rings 107 and 119 so as to quickly, and uniformly cool the tire T while the cords are under tension.

After the post inflator has done its job, the upper disc 106, ring 107 and hood 108 are raised by suitable means, as by the upward movement of the press head 6 in the embodiment shown in FIGS. 9 and 10. The piston 116 is moved down to lower the disc 118 and the tire T testing thereon. The downward movement of the tire T is arrested by the anti-friction rollers 121 and, accordingly, the cured and post-inflated tire T will slide down the inclined platform provided by said rollers and will be discharged onto the takeaway conveyor 34.

6. OPERATION

At the outset it should be stated that the apparatus herein disclosed may be automatically controlled by judicious placement of limit switches and the like for operation by the various components of the apparatus so as to start and stop the electric drive motors, to open and close solenoid valves for operating the several fluid motors herein shown, and to energize a timing device which keeps the press closed for the prescribed cure period. Such switches, valves, timers etc. have not been illustrated herein since it is within the realm of the skilled artisan to provide the same where needed and to interconnect them to achieve the desired operations in the desired sequence and for the desired time periods. In the ensuing description of the operation of the present apparatus it will be assumed that such automatic controls will be provided, although it is to be understood that each component may be separately set in motion by manually operating a switch or valve, or a timer.

The operation of the press disclosed herein may be varied in certain respects from that hereinafter outlined, but in the preferred mode of operation when the press is open with the top mold section 28 spaced above and laterally offset with respect to the bottom mold section 25, as shown in dot-dash lines in FIG. 1, and in full lines in FIGS. 3 and 4, the carcass loader 45, or the other loaders herein disclosed, will be at the top in carcass-receiving position.

By way of example, the pulley band tire carcass T herein is a 4-ply rayon cord passenger car tire and when the supply conveyor 40 is set in operation a carcass T will be dumped from the saddle 41 as the latter passes over the top sprocket wheel 43 and the carcass loader. In this position of the carcass loader at the top the stop bar 67 is in the raised position shown in FIGS. 1 and 4 so as to prevent the carcass T from falling through the carcass loader.

When there is a carcass in said loader 45 with its bottom bead engaged with the stop bar 67, fluid under pressure may be admitted into the cylinder 65 to raise the piston 64 which, through the movable frame 63 and links 62, causes the loader segments 46 to move radially inwardly to grip the carcass T therebetween. Now, the motor 53 may be energized to cause the cable drums 52 to rotate in a counterclockwise direction, as viewed in FIG. 4, whereupon the loader 45 and the carcass T grip therein is permitted to descend by gravity, the movement downward being guided by the slot 48 in the bracket 47 in which slot the rollers 49 of the loader 45 are disposed. As the loader 45 moves downwardly the stop bar 67 swings down out of the way.

When the carcass loader 45 with the carcass T has been lowered to the position shown in FIG. 4, the cylinder 65 may be actuated to cause the piston 64 to move downwardly and through the frame 63, and links 62 move the segments 46 radially outwardly to release the carcass T so that it may drop down in upright position around the toe ring 26 of the bottom mold section 25. When the carcass T has thus been released the motor 53 may be actuated in the opposite direction to cause the cable drums 52 to rotate in a clockwise direction, as viewed in FIGS. 3 and 4, thereby winding the cable 51 thereonto to raise the carcass holder back up to its top carcass-receiving position.

After the carcass T has been set in upright position coaxially with the bottom mold section 25, the bull gear drive 18 may be energized to cause the bull gear crank 15 to turn in a counterclockwise direction, as viewed in FIGS. 1 and 3, whereupon the top mold section 28, which is carried by the upper press head 6, is caused to first move laterally to a position coaxially above the bottom mold section 25 and then is caused to move downwardly and during the downward movement of said top mold section 28 the toe ring 29 thereof will engage within the top bead of the upright carcass.

As the top mold section 28 thus moves downwardly to contact the top bead of the carcass, it initiates "bellying" of the carcass and rolling of the beads thereof around the toe rings 26 and 29. At that time a diaphragm (not shown) in the base 1, if employed, may be turned inside out as described in Brundage Ser. No. 443,917 filed July 16, 1954 so that the diaphragm will be laid progressively against the partially bellied inside wall of the carcass.

Finally, when the crank link 12 is in the vertical position shown in FIG. 1, the press has been fully closed and the mold sections 28 and 25 are in mating engagement.

After the mold sections 28 and 25 have thus been brought into mating engagement curing medium (steam or hot water) at a pressure of say, 100 to 300 p.s.i. may be admitted into the carcass T to effect final shaping of the carcass to tire shape and to cure it in that shape. For a rayon cord tire, as aforesaid, the heating platens 27 and 31 may be heated to say, about 320° F. and the curing medium may be, for instance, hot water.

After the prescribed curing period and after the curing pressure has been vented the drive unit 18 will be energized to rotate the bull gear crank in a clockwise direction, as viewed in FIG. 1, to move the top mold section 28 upwardly and thence laterally, and preferably the bottom mold section 25 will have been sprayed or dusted with anti-sticking component so that the cured tire will be stripped from the bottom mold section 25 and will be lifted and laterally shifted by the top mold section 28.

When the press is open, as best shown in FIG. 3, the cylinder 30 is actuated to force the toe ring 29 downwardly with respect to the top mold section 28 and at the same time the stripper bar 35 will spring in between the top side wall of the tire T and the top mold section 28 so that if the bead sticks to the toe ring 29 after being stripped from the top mold section 28, the tire T will be stripped from the toe ring 29 as the latter is moved upwardly to its seated position in the top mold section 28.

The cured tire T drops down onto the inclined platform 32 and then slides down and away from the press onto the takoff conveyor 34.

When nylon cord or like tires are being shaped and cured the cured tire T, while yet in heated condition, will be discharged from the top mold section 28 onto the bottom disk 117 of the post inflation device, the cylinder 115 having been actuated to move the piston 116 upwardly to position the disk 117 as shown in FIG. 9.

When the press is closed, as previously described, to effect shaping and curing of the next carcass T the top disk 106 of the post inflation device will contact the top bead of the cured tire T, as shown in FIG. 9. At that time fluid under pressure, for instance, air under pressure, may be admitted into the cured tire to impose a tensile stress in the cords thereof while the side walls and tread of the tire are unconstrained. The air pressure inside the tire may be on the order of 50 p.s.i. After the air pressure has been applied, cooling water may be admitted through the hose 109 and pipe 120 into the spray rings 107 and 119 whereby cooling water is uniformly sprayed on the outer surfaces of the stressed tire. Such cooling and post inflation of the tire may be continued together or separately depending on the tire construction and size for the entire duration of the curing period, or may be cut off at any shorter time, if desired.

Now, when the press is opened after the cure, the top disk 106 will move up away from the tire leaving the same on the bottom disk 117. Thereafter the cylinder 115 is actuated to cause the piston 116 and the bottom disk 117 to move downwardly to the position shown in FIG. 10, thus stripping the bottom plate 117 from the tire T and leaving the tire on the inclined platform, as defined by the rollers 121, whereby the tire slides down and away from the press onto the takeaway conveyor 34.

From the foregoing description of the details of the construction of the press herein it will be seen that the top press head 6 is pivotally mounted on the horizontal shafts 8 with the center of gravity of said head disposed below the axis of said shafts. Thus, as the press head 6 moves up and down and laterally, the top mold section 28 will remain in horizontal position by gravity even if the guide slot 3 were omitted.

In the operation of tire vulcanizers heretofore, the top mold section has been raised to make room for the removal of the cured tire and the insertion of the uncured tire. In some cases the top mold section has been tilted or otherwise moved to provide the working space necessary.

With an automatic loading and unloading press of the type described and shown, the space for loading the tire must still be provided; however, the tire needs to be unloaded with the mold section in a horizontal position for positioning on the post inflator or on a horizontal carrier such as a belt for moving the tire away from the vulcanizer.

The apparatus of this invention provides for utilizing the substantial weight of the top mold section to maintain the mold section in a horizontal position for mating with the lower mold section and for ejecting the tire downward from a horizontal position. This is done as aforesaid by providing for suspension of the top mold section 28 below the pivoted connection with shafts 8 and having an axis in substantial vertical alignment with the center of the bottom mold section 25. The heavy weight of the top mold section 28 is thereby used to maintain vertical alignment as the upper pivoted connection is moved vertically and horizontally. A lightly loaded guide such as slot 3 may be used as a safety device in the event of a sticky bearing; however, the weight of the mold section itself provides for keeping the top mold section in a horizontal disposition and no constraint is necessary in normal operation.

It is therefore one main concept of this invention to provide an automatic loading and unloading vulcanizer in which the top mold section 28 is constrained in a horizontal disposition for closing with the bottom mold section and for ejecting the cured tire from a horizontal position by the use of apparatus in which the top mold section is suspended from a pivoted connection which is moved vertically and horizontally as desired. In other words, the force of gravity is utilized in thus maintaining the top mold section 28 in horizontal position at all times during the vertical and horizontal movements of the shafts 8 from which the upper movable press head 6 and mold section 28 are pivotally suspended.

Another characterizing feature of the present invention is that the pulley band carcasses that are loaded onto the bottom mold section 25 first have been rounded or reshaped to cylindrical form. Thus, a press equipped with any of the carcass loaders herein disclosed will be supplied with cylindrical carcasses since the arcuate segments 46 (FIGS. 1–8), or the arcuate segments 92 (FIGS. 14–16), or the uniformly expansible bag 83 (FIGS. 11–13) will, in gripping the carcass, re-shape it, if out-of-round, to cylindrical form for proper seating of the bottom bead thereof about the bottom toe ring 26 and for proper entry of the top toe ring 29 into the top bead of the carcass.

In connection with the basket type loaders as shown in FIGS. 1 to 7 and FIG. 8, it is contemplated instead of providing a supply conveyor 40 to lower the basket 45 down to about mold level when the press is closed. Accordingly, the press operator may at that time place the next carcass into the basket 45. At that time the basket 45, with the carcass therein, may be raised to the solid line position shown in FIG. 1, for example, and then when the press is open the basket 45 may be lowered to place the carcass therein on the toe ring 26 of the bottom mold section 25. By employing this modified method of operation, the supply conveyor 40, as shown in FIGS. 1 and 3, may be dispensed with. It is also conceivable that the expanding types of carcass loaders, as shown in FIGS. 11 to 16, may similarly be loaded while the press is closed and while the holder is in the lowered position, as shown in the dot-dash lines in FIG. 11. In that case, the carcass holder may be raised and swung around ready for swinging the carcass and lowering it when the press is in open position, as shown in FIG. 11.

Other modes of applying the principle of the invention may be employed, change being made as regards the details described, provided the features stated in any of the following claims, or the equivalent of such, be employed.

We therefore particularly point out and distinctly claim as our invention:

1. In combination, a tire curing press comprising a base which carries a bottom upwardly facing mold section, a movable press head which carries a top downwardly facing mold section and which is supported by said base for movement between open and closed positions whereat said top mold section is spaced above and laterally offset with respect to said bottom mold section and whereat said mold sections are in mating engagement, and means for thus moving said press head; a carcass loader carried by said press head and thus movable with respect to said base to position a carcass held thereby coaxially above said bottom mold section when said press is open, said loader being operative to place the carcass on said bottom mold section for engagement by said top mold section as the press is closed, said loader including a carcass holder and guide along which said holder moves downwardly to place a carcass on said bottom mold section.

2. The combination of claim 1 wherein said loader guide includes a guide bracket which depends downwardly from said press head.

3. The combination of claim 1 wherein said loader guide includes mechanism for moving said holder upwardly out of telescoped relation with the carcass.

4. The combination of claim 3 wherein said mechanism is further operative to swing said holder from downwardly extending position to upwardly extending carcass-receiving position.

5. In combination, a tire curing press of the type including a base and a movable press head respectively carrying complementary bottom and top mold sections and means for moving said press head and the top mold section carried thereby upwardly and laterally to expose said bottom mold section for overhead loading; a carcass holder; holder guide means mounted on said press head to support said holder for movement from top, carcass receiving position down to carcass releasing position whereat the carcass is positioned coaxially above and is released onto said bottom mold section when said press head and the top mold section carried thereby have thus been moved upwardly and laterally to expose said bottom mold section; and means operative to lower and to raise said holder.

6. The combination of claim 5 wherein a carcass conveyor is located to supply carcasses to said holder when raised to its top, carcass-receiving position.

7. In comibnation, a tire curing press of the type including a base and a movable press head respectively carrying complementary bottom and top mold sections, means for moving said press head and the top mold section carried thereby upwardly and laterally to expose said bottom mold section for overhead loading, and means carried by said movable press head for stripping a cured tire from said top mold section after the latter has been so moved upwardly and laterally; and post-inflation means including a bottom disk laterally of said base beneath said top mold section when thus upwardly and laterally moved operative to engage the bottom bead of the tire stripped from said top mold section, a top disk carried by said press head operative, upon movement of the latter laterally and downwardly to bring said mold sections into mating engagement, to engage the top bead of the tire, means for supplying fluid under pressure into the cured tire to stress the wall thereof.

8. The combination of claim 7 wherein means are provided for directing cooling medium on the cured tire while the tire is held between said top and bottom disks.

9. The combination of claim 7 wherein an inclined platform with an opening therethrough is disposed laterally adjacent to said bottom mold section and below said bottom disk, and means for lowering said bottom disk through such opening to a position below said platform whereby the tire thereon is lowered onto said platform for sliding down and away from said press.

10. The combination of claim 7 wherein complementary hood means supported by said press head are disposed about the respective disks to form a chamber thereabout and about the tire engaged therebetween, and wherein spray cooling means in said chamber is effective to spray coolant upon the tire held between said disks.

11. In combination, a tire curing press of the type including a base and a movable press head respectively carrying complementary bottom and top mold sections, means for moving said press head and the top mold section carried thereby upwardly and laterally to expose said bottom mold section for overhead loading, and means for stripping a cured tire from said top mold section after the latter has been so moved upwardly and laterally; a carcass holder; holder guide means mounted on said press head to support said holder for movement from carcass receiving position when said press head and the top mold section carried thereby have thus been moved upwardly and laterally to expose said bottom mold section to carcass releasing position whereat the carcass is positioned coaxially above and is released onto said bottom mold section; means operative to lower and raise said holder; and an inclined platform disposed laterally adjacent to said bottom mold section and beneath said top mold section when thus raised and laterally shifted, said platform being operative to catch the cured tire thereon for sliding down and away from said press.

12. In a tire press comprising a stationary mold section and a movable mold section; means to move said movable mold section directly away from and then laterally with respect to said stationary mold section to open said press, a press loader mounted on said movable mold section and adapted to receive a tire carcass, said loader including a carcass holder and guide means and means to actuate said loader to move said holder along said guide means to place such carcass on said stationary mold section while the press is open.

13. A tire press as set forth in claim 12 including means for stripping a cured tire from said movable mold section when said press is open, a disk positioned laterally of said stationary mold section operative to engage the bottom bead of such cured tire when stripped from said movable mold section, a disk mounted on said movable mold section mutually cooperating with said first-mentioned disk to form a post-inflation device for such cured tire when said press is closed to form and cure such carcass.

14. In a tire press comprising a stationary mold section and a movable mold section; a disk laterally adjacent said stationary mold section, means to move said movable mold section directly away from and then laterally of said stationary mold section to a position above said disk to open said press, means to strip a cured tire from said movable mold section whereby the bead of such cured tire will engage said disk, a second disk mounted on said movable mold section and adapted mutually to cooperate with said first-mentioned disk to form a post-inflation device for such cured tire when said press is closed.

15. A tire curing press comprising a base; a bottom mold section mounted on said base; a top mold section; a movable support from which said top mold section is suspended about a horizontal pivot; means for moving said support vertically and laterally with respect to said bottom mold section to open said press, the top mold section being located in vertical alignment beneath such pivot during such vertical and lateral movement of said support; guide means on said base including a cam with which said horizontal pivot is engaged to guide the vertical and lateral movements of said support; and auxiliary guide means engaged by said support to preclude free swinging movement of said top mold section as said support is thus moved vertically and laterally.

16. In combination, a tire curing press of the type including a base and a movable press head respectively carrying complementary bottom and top mold sections, means for moving said press head and the top mold section carried thereby vertically and laterally to expose said bottom mold section for overhead loading; a carcass holder, means operative in response to lateral movement of said press head and the clearing of said bottom mold section laterally to shift said holder to press loading position whereat the carcass in said holder is positioned above said bottom mold section; holder guide means mounted on said press to support said holder for vertical movement to guide said holder to carcass releasing position whereat the carcass is released and positively placed onto said bottom mold section; and means operative to lower said holder while firmly gripping such carcass along said guide means thus positively to place the carcass on said bottom mold section.

17. A tire curing press including a base carrying a bottom mold section having a toe ring to position and center the bead of a tire carcass therein, a movable press head carrying a top mold section, means for moving said press head and top mold section upwardly and laterally to expose said bottom mold section for overhead loading of a tire carcass thereon; a carcass holder; holder guide means mounted on said press to support said holder for movement of said carcass from an upper position coaxially above and spaced from said bottom mold section to a lower position positively to place such bead of such carcass around the toe ring of said bottom mold section, and means operative thus to move said holder and carcass held thereby downwardly along said guide means, said holder firmly gripping the carcass substantially throughout the downward movement thereof.

18. A tire carcass loading mechanism for a tire curing press having upper and lower mold sections comprising a tire carcass holder, means operative to shift said holder laterally into position above said lower mold section when the press has been opened and the lower mold section cleared for overhead loading, means operative to move said holder vertically downwardly to place such carcass on said lower mold section, means operative to release such carcass from said holder after such carcass has thus been placed in said lower mold section, and means operative to shift said holder laterally clear of said lower mold section after release of such carcass thereon and prior to closing of said press.

19. A tire curing press as set forth in claim 17 wherein said carcass holder comprises a plurality of radially movable segments, and means operative radially to move said segments inwardly to grip exteriorly such tire carcass and radially outwardly to release such carcass after it has been placed around the toe ring of said bottom mold section.

References Cited in the file of this patent

UNITED STATES PATENTS

| | | |
|---|---|---|
| 1,718,660 | Myers | June 25, 1929 |
| 2,104,673 | Rieser | Jan. 4, 1938 |
| 2,296,800 | Soderquist | Sept. 22, 1942 |
| 2,641,021 | Wikle | June 9, 1953 |
| 2,730,763 | Brundage | June 17, 1956 |
| 2,775,787 | Krag | Jan. 1, 1957 |
| 2,808,618 | Soderquist | Oct. 8, 1957 |
| 2,812,544 | Soderquist | Nov. 12, 1957 |
| 2,832,991 | Soderquist | May 6, 1958 |
| 2,927,343 | Soderquist | Mar. 8, 1960 |
| 2,978,741 | Soderquist | Apr. 11, 1961 |

FOREIGN PATENTS

| | | |
|---|---|---|
| 209,091 | Australia | Nov. 22, 1956 |
| 1,580/56 | Union of South Africa | Jan. 2, 1957 |